(12) United States Patent
Grözinger

(10) Patent No.: US 7,665,578 B2
(45) Date of Patent: Feb. 23, 2010

(54) DEVICE AND PROCEDURE FOR PROVIDING A FINE MIST OF OIL

(75) Inventor: Michael Grözinger, Maulbronn (DE)

(73) Assignee: Acculube Manufacturing GmbH, Maulbronn (DE)

(*) Notice: Subject to any disclaimer, the term of this patent is extended or adjusted under 35 U.S.C. 154(b) by 811 days.

(21) Appl. No.: 11/109,869

(22) Filed: Apr. 20, 2005

(65) Prior Publication Data

US 2005/0241882 A1 Nov. 3, 2005

(30) Foreign Application Priority Data

Apr. 20, 2004 (DE) .................. 10 2004 019 686
Mar. 21, 2005 (DE) .................. 10 2005 013 458

(51) Int. Cl.
 *F16N 7/30* (2006.01)
(52) U.S. Cl. .................. 184/55.1; 184/55.2; 184/6.26; 184/50.2; 184/56
(58) Field of Classification Search .............. 184/55.1, 184/55.2, 6.26, 50.2, 56
See application file for complete search history.

(56) References Cited

U.S. PATENT DOCUMENTS

| | | | |
|---|---|---|---|
| 3,775,025 A | | 11/1973 | Maher, Jr. et al |
| 4,205,708 A | * | 6/1980 | Burgbacher .................. 139/1 R |
| 4,735,286 A | * | 4/1988 | Miki et al. .................. 184/6.4 |
| 5,042,618 A | | 8/1991 | Switalski et al. |
| 5,165,862 A | * | 11/1992 | Lindblom .................. 417/216 |
| 5,226,506 A | * | 7/1993 | Link .................. 184/6.26 |
| 5,678,466 A | * | 10/1997 | Wahl .................. 83/168 |
| 5,775,881 A | | 7/1998 | Stich |
| 6,145,626 A | * | 11/2000 | Niemczura, Sr. et al. ... 184/55.1 |
| 2002/0084146 A1 | * | 7/2002 | Itoh .................. 184/57 |

FOREIGN PATENT DOCUMENTS

WO 02/060592 8/2002

* cited by examiner

*Primary Examiner*—Robert A Siconolfi
*Assistant Examiner*—James K Hsiao
(74) *Attorney, Agent, or Firm*—Lowe Hauptman Ham & Berner LLP

(57) ABSTRACT

The invention relates to apparatus and a method for preparing a fine oil mist, in particular to be fed into tool lubrication ducts of a CNC machine tool.

The apparatus is turned ON/OFF solely using the standardized machine commands M08 ("Cooling lubricant ON") and M09 ("Cooling lubricant OFF").

The control/regulation of the tools' aerosol supplies then will be fully automatic. It involves—contrary to known quantitative regulations—a simple regulation by means of aerosol pressure values.

When starting the apparatus or following a change of tools, all aerosol pumps are operating, including, where tools exhibit cross-sectionally large boreholes, an oil over-enriching pump.

At least one aerosol pump operates when regulated within a range of supply pressures. When the upper pressure value of the supply pressure range is exceeded, the pump(s) shut(s) down until the aerosol supply has been exhausted and will turn ON again when the lower pressure value of the supply pressure range is crossed downward because of aerosol consumption.

12 Claims, 1 Drawing Sheet

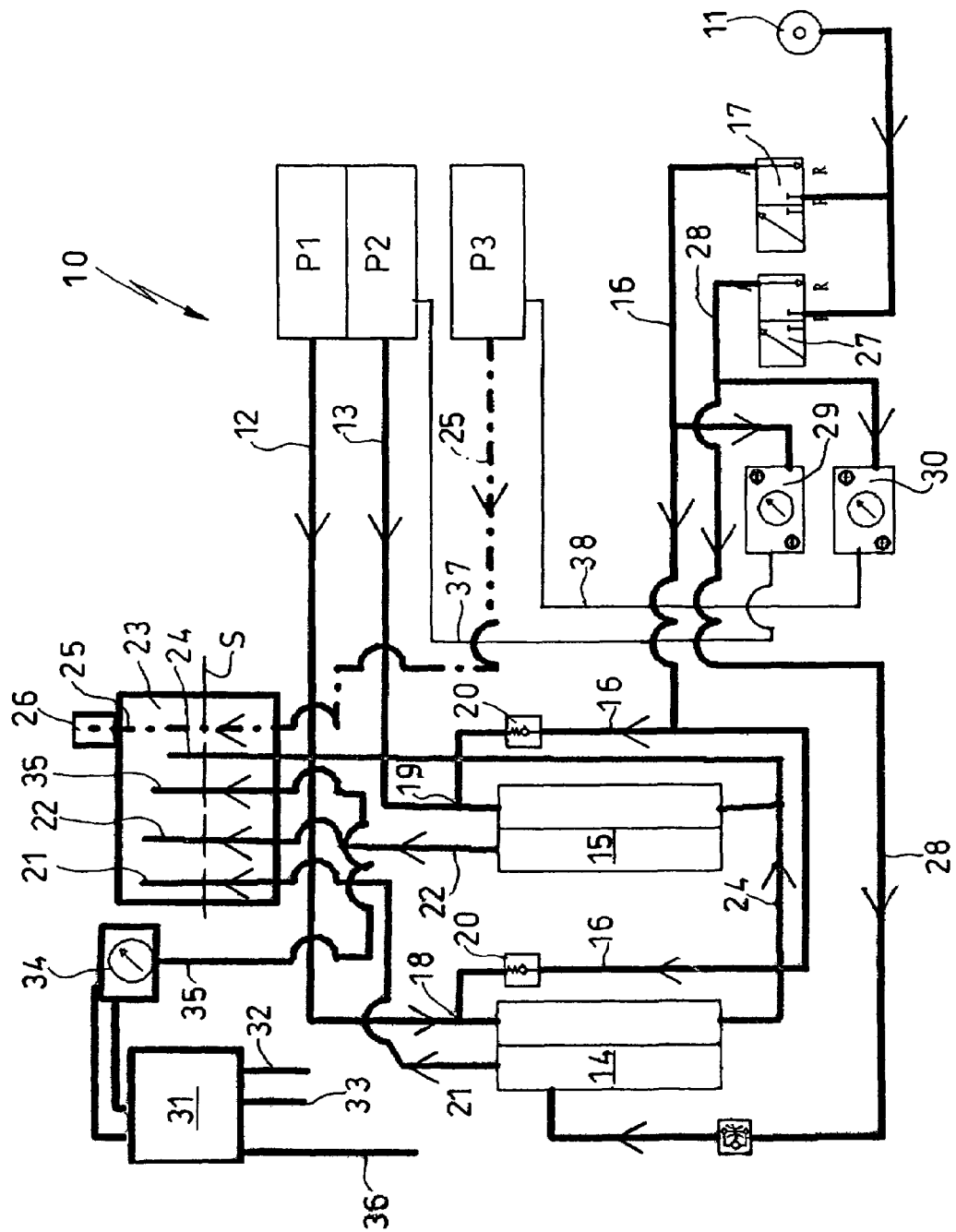

US 7,665,578 B2

DEVICE AND PROCEDURE FOR PROVIDING A FINE MIST OF OIL

RELATED APPLICATIONS

The present application is based on, and claims priority from, German Application Numbers 10 2004 019 686.9 and 10 2005 013 458, filed on Apr. 20, 2004 and Mar. 21, 2005, respectively, the disclosures of which are hereby incorporated by reference herein in their entirety.

FIELD OF THE INVENTION

The present invention relates in part to apparatus for producing a fine oil mist and more particularly to an apparatus which feeds such a mist into lubricating ducts of the tools of CNC machine tool. More specifically, at least one embodiment comprises oil conveying pumps and at least one compressed air conduit conveying air, along with at least one oil-air mix generator combining oil and air into a fine mist of oil (aerosol) and feeding it to a supply vessel from which the oil mist is fed through a supply conduit to the tool.

BACKGROUND OF THE INVENTION

The above apparatus also is known as a minimum amount lubrication system. Such type of apparatus includes at least one oil-air mix generator producing the oil-air mix. This mixture is fed in pressurized form for purposes of lubrication to the tools of a CNC machine tool.

The nearest state of the art is a well known and previously used "minibooster system" made by the entity to which the instant application is assigned. This system comprises three oil-air mix generators each with its associated pump, which may be applied individually depending on the tool used, i.e. depending on the cross-section of the internal lubricating ducts of the particular tool.

Large diameter tools typically also exhibit large lubricating duct cross-sections, and consequently all three pumps must be operated to produce the oil-air mix in order to assure both an adequate amount of lubrication and corresponding conveyance pressure. As regards tools of smaller diameters that are fitted with commensurately smaller lubricating duct cross-sections, only one or two pumps are needed to generate an adequate film of lubrication.

It is typical practice in the state of the art to manually program the lubrication output as function of the particular tools used, namely by employing so-called M functions. M functions are standardized machine or switching commands operating a CNC machine tool. Different M functions must be used in the CNC program for each different tool. Accordingly a large number of tools must be programmed to attend to a large plurality of tools.

Programming is used to assure smooth-running production. The operation of too many pumps for a small-diameter tool and for a small cross-section of the lubrication ducts results in excessive feed pressure. Accordingly, due to this small lubrication duct cross-section, a back pressure may become so large that, in spite of sufficient lubricant in the supply receptacle, the tool nevertheless is lubricated insufficiently. In the reverse case of large tools, a similar situation arises when an insufficient number of pumps are operating.

In both instances insufficient lubricant at the tool entails increased tool wear and possibly tool failure.

Even though the previously used minibooster system has been successfully used in practice, it still leaves room for improvement because on occasion problems arise in erroneous operation, i.e. defective programming of the M-functions. In principle cutting may be fully automatic, the more so that the machines also are able to automatically change the particular tools. Therefore degradation of production on account of defective programming is considered a substantive impediment.

Accordingly embodiments of the present invention are directed to a new apparatus minimizing application of lubricants while retaining the conventional feed to tools having different and strongly diverse cross-sections of lubricant ducts, and to do so without involving elaborate, manual programming.

SUMMARY OF THE INVENTION

At least one embodiment comprises a pressure sensor measuring the aerosol pressure in the supply tank (supply pressure) and a control unit which, when the apparatus is turned ON, initiates the air feed and at least one aerosol pump and one oil over-enriching pump to generate the oil-air mix, and that furthermore the control unit stops the oil over-enriching pump when a predetermined first supply pressure $p2$ is reached.

stops the minimum of one aerosol pump when a predetermined maximum permissible supply pressure $p4$ is reached, restarts the minimum of one aerosol pump when a predetermined third supply pressure $p3$ is crossed downward, and restarts the oil over-enriching pump when a predetermined fourth supply pressure $p1$ is crossed downward, where $p1<p2$, $p3<p4$.

In another embodiment, the apparatus is switched ON via a control line using the standardized machine command M08 ("Cooling lubricant ON") and is turned OFF using the standardized machine command M09 ("Cooling lubricant OFF").

As regards the pressure values, at least one embodiment provides compressed air and an aerosol supply at about 6 bars into the supply tank such that the tank pressures will be approximately $p1=1.6$ bars, $p2=1.8$ bars, $p3=3.8$ bars and $p4=4.1$ bars. These values are approximate and even may slightly vary in either direction. Even special settings may be applicable in special applications.

Advantageously the embodiments adequate supply of oil-air mix quantity within a predetermined pressure range by using merely the automated control depending on the supply pressure—not by the quantitative control of compressed air and/or oil—of pumps and air feed. When the supply pressure drops due to a decrease in oil-air mix passing through the conduit to the tool, the supply tank shall be refilled again with a fine mist of oil after the pressure falls below a value $p3$ by means of oil and compressed air feed from the aerosol generators.

In this manner not only an adequate quantity of the oil-air mix is available in the supply tank for the tools generally used, but also a relatively high shutoff pressure $p4$, defined in the control unit, assures a maximum feed pressure.

Contrary to the situation in the state of the art, which raises the conveyance pressure in uncontrolled manner by merely turning pumps ON as a function of the particular tools used, the present invention assures—by a predetermined maximum feed pressure when using small tools—that the lubricant feed to the tool cannot be interrupted by an excessively high back-pressure.

Erroneous programming such as encountered in the state of the art is precluded in the embodiments of the present invention because the generation of the oil-air mix is automatically triggered by the control unit as a function of the tank pressure.

Special programming of given pressure values or ON or OFF states of numerical control are not required in the present invention because therein the apparatus is turned ON by means of the standard machine command M08 ("Cooling lubricant ON") and is turned OFF by means of the standardized machine command M09 ("Cooling lubricant OFF"). In the embodiments of the invention, the apparatus operates most effectively, reliably and in fully automated manner between the turn ON command M08 ("Cooling lubricant ON") and the turn OFF command M09 ("Cooling lubricant OFF") which it receives from the machine tool control unit.

Turning ON the oil over-enriching pump is especially significant for tools having cross-sectionally large cooling lubricant ducts. When tools fitted with cooling lubricant ducts of large cross-sectionally areas are used, the discharge of large amounts of oil-air mixes prevents building up of an adequate pressure in the supply tank. By automatically supplying supplemental air and by directly feeding oil into the conduit to the tool by means of the control unit, the invention advantageous assures that adequate amounts of lubricant and air are made available even when using tools having cross-sectionally large lubricant ducts.

In an embodiment mode of the invention, two oil-air mix generators operating in parallel are used, each one with its own oil conveying pump. In this manner, the apparatus of the invention may be advantageously made of known and foremost of tested components of the state of the art. Besides economical manufacture, high reliability of the minimum-quantity lubricating system is also assured. Also only one instead of two aerosol pumps may be used.

A specially preferred embodiment mode of the invention is characterized in that the oil over-enriching pump is connected by a conduit directly to the tool and in that an additional compressed air conduit to feed supplemental air is connected to at least one oil-air mix generator, the supplemental air feed and the oil over-enriching pump being shut OFF by the control unit when the third tank pressure value $p2$ has been reached.

Another embodiment of the apparatus of the invention is characterized in that the aerosol pumps and the oil over-enriching pump are designed as pneumatic pumps connected to particular compressed air conduits and are operated by applied air or supplemental air. In this manner the air required by the apparatus is also used to operate the pumps. As a result additional power lines (such as electric cables) no longer are needed and more-over the pumps used are simple in design. In especially advantageous manner, the apparatus control complexity is reduced because no more is needed than starting/terminating the particular feed of air by the control unit in order to turn ON/OFF the said pumps.

Power-controlling frequency generators may precede the pumps and the oil over-enriching pump.

Furthermore, the invention relates to a method for preparing a fine oil mist in particular to be fed into the lubricant ducts of the tools of a CNC machine tool, whereby compressed air and oil are fed by pumps to oil-air mix generators to generate a fine oil mist (aerosol), the pumps and the compressed air feed being configured as a function of the particular tools being used.

One method solving the problems of the invention is defined by the features of the independent claim 8 and is characterized in particular by the intrinsic features of the present invention whereby the aerosol pressure (tank pressure) is measured and the oil-air mix generators (after the apparatus has been turned ON) are driven exclusively by preset tank pressure values.

The standardized machine command M08 ("Cooling lubricant ON") turns the apparatus ON and the standardized machine command M09 ("Cooling lubricant OFF") turns the apparatus OFF.

In the regulating mode, the pumps implementing aerosol generation operate continuously within a tank pressure range between $p0=0$ and $p4<6$ bars. When a supply pressure falls below predetermined tank pressure $p1$, the oil over-enriching pump is reconnected and supplemental air then shall be fed to at least one oil-air mix generator.

In this method, when the compressed air or aerosol feed is at about 6 bars, the tank pressure values $p1$ are about 1.6 bar, $p2$ about 1.8 bar, $p3$ about 3.8 bar and $p4$ about 4.1 bar. These are approximate values which may be slightly varied in both directions or also may be frozen in special applications.

Aside from the general programming "Cooling lubricant ON", "Cooling lubricant OFF", the method of the present invention allows omitting separate and tool-specific ON/OFF commands to the particular pumps. Because the lubricant duct cross-sections, depending on the tool diameter, pass different quantities of cooling lubricant into the tool, whereby the tank pressure is decreased, driving the oil-air mix generators by means of a predetermined ON/OFF pressure assures the availability of an adequate quantity of fine oil mist independently of the sizes of the tools being used.

The description of the drawing below elucidates the present invention.

BRIEF DESCRIPTION OF THE DRAWINGS

FIG. 1. depicts an embodiment of the present invention.

DETAILED DESCRIPTION OF THE EMBODIMENTS OF THE INVENTION

The drawing shows an apparatus, denoted overall by "10", feeding minimal quantities of lubricant to the tool head of a CNC machine tool. For the sake of clarity, the conduits shown in the drawing and of which the functions are discussed below, denote the directions of flow.

The apparatus 10 comprises a compressed air hookup 11 feeding it with the needed conveyance air preferably at a standard pressure of 6 bars. Three pumps P1, P2, P3 are used for moving the oil which serves as lubricant. For further clarity, the pumps P1 and P2 also are denoted as "aerosol pumps", the pump P3 as the "oil over-enriching" pump even though all serve to produce aerosol.

In this embodiment mode the pumps P1, P2 and P3 are pneumatic pumps. Pump P1 is connected by the conduit 12 to the oil-air mix generator 14 and pump P2 is connected through the conduit 13 to the oil-air mix generator 15. Both oil-air mix generators are fitted in the mouth zones of the conduits 12 respectively 13 with an atomizing nozzle (omitted here). The conveying air is applied upstream through the conduit 16 to said atomizing nozzle. The airflow issuing from the compressed air hookup 11 is controlled by a valve 17. To prevent oil pressurized by the pumps P1 and P2 from entering the air conduit 16, this conduit is fitted with check valves upstream of the air feed sites 18 and 19.

Starting at the oil-air mix generators 14 and 15, oil-air mix conveying conduits 21 and 22 as well as an oil recycling conduit 24 run to an oil/oil-mist tank 23. This tank contains oil at a liquid level S, the space above the liquid oil level S being filled during operation with oil mist.

In order to assure an adequate oil supply even for large-diameter tools, the apparatus of the invention provides a so-called oil over-enriching pump P3 which is connected by a capillary conduit 25—while bypassing the tank 23—directly to a feed conduit 26 to the tool head of a CNC machine tool. To assure adequate oil supply of tools having large lubricant duct cross-sections, the apparatus 10 includes an supplemental air feed conduit 28 separately controlled by a valve 27 which in the present instance applies additional conveying air to the oil-air mix generator 14. However the conduit 28 may just as well issue into the oil-air mix generator 15 or also in the two oil-air mix generators 14 and 15.

The apparatus of the invention comprises two frequency generators 29 and 30 to regulate the feed output of the pumps P1 through P3. The pumps P1 and P2 in the present embodiment are operated in parallel and are regulated by the frequency generator through the air conduit 37 connected thereto. The frequency generator 30 regulates the feed output of the pump P3 to which it is connected by the air conduit 38. In this embodiment mode the frequency generators are connected to the air conduits 16 and 28 respectively, as a result of which the air required to operate the pumps shall be taken from the compressed air conduits 16 and 28 when the valves 17 and 27 respectively are opened.

The apparatus of the invention is controlled by a control unit 31 which in a manner not shown in the drawing and using two switching lines 32 and 33, can open as needed the valves 17 and 27 to feed the conveying air. In order to determine the need for supplemental conveying air and supplemental oil-air mix, the control unit 31 comprises a pressure sensor 34 which, connected by a conduit 35 to the tank 23, measures the applied pressure, namely the so-called supply pressure in the apparatus 10. The apparatus 10 is turned ON/OFF by the command "Cooling lubricant ON/OFF" transmitted through a control line 36.

The operation of the apparatus 10 is comprehensively discussed below.

The apparatus 10 is started by the machine command ("Cooling lubricant ON". The control unit 31 measures the supply pressure by means of the pressure sensor 34 and opens the valve 17 provided that the pressure in the apparatus 10 (the supply pressure) is less than a critical value set at the site of operation (for instance $p3=3.8$ bar). As conveying air flows for instance at about 6 bars, the pumps P1 and P2 are supplied from the air conduit 37 with the air flow required for operation, the pumps' output being regulated by the frequency generator 29. Air and the oil conveyed by the pumps P1 and P2 passes through the (omitted) atomizer nozzles into the oil-air mix generators 14 and 15, as a result of which the oil-air mix has been made available with oil particles in their most minute state (preferably in the microscopic range). Larger oil particles deposit on the inner wall surfaces of the oil-air mix generators 14, 15 and pass through the oil return conduit 24 back into the tank 23 from where they are recycled into the oil circuit. Applicant's German patent DE 298 11 504 U1 discloses an illustrative design of the oil-air mix generators 14 and 15.

The oil-air mix passes through the oil-air mix conduits 21 and 22 into the oil and oil mist tank 23 and from there into the feed conduit 26 to the tool (not shown). This process continues until a shutdown pressure predetermined and set on site (for instance $p4=4.1$ bars) has been reached.

Below a shutdown pressure illustratively of $p3=2.1$ bars previously set on site, additional conveying air for the purpose of rapid pressure buildup passes through the valve 27 opened as needed by the control unit and through the conduit 28 into the oil-air mix generator 14 and from there through the oil-air mix conduit 21 also into the oil and oil mist tank 23. If supplemental conveying air is applied, the pump P3 also receives from the air conduit 38 the air flow required for operation, the airflow being regulated if needed by the frequency generator 30. The oil conveyed by the pump P3 passes through the capillary conduit 25 while bypassing the oil and oil mist tank 23 directly into the conduit 26 and then into the tool head. In this manner the supply of lubricant is already initially assured in the critical start stage to make immediately available an adequate quantity of oil, an adequate conveying pressure and an adequate quantity of air to ensure tool lubrication at the beginning of cutting.

During regulation, the pressure in the tank 23 is maintained by the control unit 31 within the range set at the site (in this instance $p0=0$ bar and $p4=4.1$ bars). The oil mist supply made available by the pumps P1 and P2 as well as by the air supply through the conduit 16 suffice as regards tools of small and middle diameters up to about 12 mm. The problem of inadequate lubricant supply of small tools (up to about 8 mm diameter) is circumvented by the automated pressure regulation in the tank 23. By operating the apparatus 10 in the pressure range between $p3=3.3$ bars and $p4=4.1$ bars, the back pressure arising from the small lubricant duct cross-section is precluded from exceeding a critical value. As a result even small tools are fed with sufficient lubricant without need for special programming as mandatory in the state of the art.

Again, the quantity of oil-air mix made available by the pumps P1 and P2 as well as the conveying air passing through the conduit 16 suffice to reliably ensure adequate lubrication. It follows that by means of the two oil-air mix generators 14 and 15 and the parallel operating pumps P1 and P2, the apparatus 10 according to the invention is a substantial improvement over the state of the art.

When more substantial tools are used for cutting (12 mm to 63 mm diameters), the larger lubricant duct cross-sections entail a significant pressure drop in the tank 23 because a larger quantity of oil-air mix is being conveyed. Nevertheless the oil-air mix production of the pumps P1 and P2 suffices down to a supply pressure of about $p2=1.8$ bars.

When the pressure drops below this threshold value, the control unit 31 opens the valve 27 and thereby increases the conveying flow. In addition, the pump P3 is made operational and conveys oil directly through the capillary conduit 25 into conduit 26 leading directly into the tool spindle and in this manner oil over-enriching the oil-air mix flow also passing through the conveyance conduit 26 to the tool head. In this manner adequate lubrication also is assured for tools having large lubricant duct cross-sections, without the need for separate manual actions or for programming an additional M function.

Actually and illustratively, a sufficient quantity of lubricant to operate large tools also can be made available using a third or even a fourth oil-air mix generator. The direct oil feed of the invention made possible at large lubricant duct cross-sections however reduces the bulk of the apparatus 10.

Accordingly the apparatus 10 is characterized by two features. Aside from turning ON/OFF the apparatus 10, no control action is needed to assure adequate lubrication. By controlling an adequate supply pressure in the oil mist and oil receptacle 23 and by controlling the oil feed through the pair of pumps P1 and P2 respectively the pump P3, sufficient lubricant is automatically applied independently of tool diameter. Erroneous programming, as sometimes encountered in the state of the art, therefore is precluded. Moreover the apparatus 10, unlike the state of the art, is operational with only two oil-air mix generators, and accordingly makes its manufacture more economical.

The second significant advantage is that the design and operation of the apparatus 10 are such that it uses tested standard components. The selected operational pressure up to 4.1 bars allows employing as before the standard 6 bar compressed air hookups. In order to allow using tested and reliable components, the apparatus 10 comprises the two pumps P1 and P2 and also the two oil-air mix generators 14 and 15 of supply pressures has been crossed downward on account of aerosol consumption.

In conclusion, the tabular survey represents an illustrative summary of the procedures followed when operating the apparatus of the invention respectively when implementing the method of the present invention.

Overview of Operations and Control Switching

| Designation of pressure p | p0 | p1 | p2 | p3 | p4 |
|---|---|---|---|---|---|
| Pressure value designation in application | | fourth | first | third | second |
| Pressure in bars | 0 | 1.6 | 1.8 | 3.8 | 4.1 |
| At apparatus start (machine command M08) | all pumps ON | | | | |
| Apparatus regulation | | | | | |
| Operation with cross-sectionally large tools | | | | | |
| Action upon exceeding the applicable pressure value | | | | pump P3 OFF | |
| Action upon dropping below the applicable pressure value | | pump P3 ON again | | | |
| Operation with cross-sectionally small tools | | | | | |
| Action upon exceeding the applicable pressure value | | | | pump P3 OFF | pumps P1, P2 OFF |
| Action when crossing downward applicable pressure value | | | | pumps P1, P2 ON again | |
| When apparatus is stopped (machine command M09) | all pumps OFF | | | | |

Tool with cross-sectionally large cooling lubricant ducts
Apparatus starts: all pumps P1-P3 turn ON; tank pressure p0 = 0 bar
Supply pressure exceeds p2 = 1.8 bars => oil over-enriching pump P3 turns OFF
Supply pressure drops during processing below p1 = 1.6 bars => oil over-enriching pump P3 switches ON again
Supply pressure rises again above p2 = 1.8 bars => oil over-enriching pump P3 again shuts down.
Tool with cross-sectionally small cooling lubricant ducts
Apparatus starts: all pumps P1-P3 turn ON; tank pressure p0 = 0 bar
Supply pressure rises in tank => beyond p2 = 1.8 bars => oil over-enriching pump P3 shuts down
Supply pressure rises further above p4 = 4.1 bars; => pumps P1 + P2 shut down
Supply pressure drops during processing below p3 = 3.8 bars; => pumps P1 + P2 turn ON again.
Apparatus is shut down; the supply pressure drops to p0 = 0 bar.

which basically are operated in parallel. The pump P3 again is a model identical with the pumps P1 and P2. Such a design assures high operational reliability and the advantages of assured spare parts supplies. Where appropriate, of course, particular devices specially designed for given applications also may be used to replace the parallel operation of the pumps P1 and P2 and of the oil-air mix generators 14 and 15.

Moreover the supply pressure up to p=4.1 bars obviates any tool adaptation. Again, further standard tools having conventional lubricant ducts may be used. The apparatus 10 of the invention therefore may be exchanged in problem-free manner against the state of the art already in place in extant work places.

In summary, the apparatus and the method of the invention for preparing a fine oil mist to be fed into lubricant ducts of the tools of a CNC machine tool is characterized essentially by the following particulars and advantages:

The apparatus of the invention is switched ON/OFF solely using the standardized machine commands M08 ("Cooling lubricant ON") and M09 ("Cooling lubricant OFF").

The control/regulation of the tools' aerosol supplies then takes place in a fully automated manner. It involves simple regulation on the basis of the aerosols' pressure values as compared to the known quantitative regulation.

When said apparatus is started, or following a change of tools and as regards tools having large cross-sectional cooling lubricant boreholes inclusive an oil over-enriching pump, all aerosol pumps are operational.

At least one aerosol pump operates in regulated manner within a range of supply pressures. When the upper pressure value of the supply pressure range is exceeded, the pump(s) shut(s) OFF until the aerosol supply has been used up and turn(s) ON again when the lower pressure value of the range

The invention claimed is:

1. An apparatus to prepare a fine oil mist, to feed said oil mist into at least one lubricant duct of at least one tool of a CNC machine tool, comprising:
   oil-conveying pumps and at least one compressed air conduit to convey air,
   at least one oil-air mix generator associated with the pumps and the at least one air conduit, the at least one oil-air mix generator processing oil and air into a fine oil mist and feeding it to a tank from which the oil mist is supplied via the at least one lubricant duct of the at least one tool,
   a pressure sensor measuring the aerosol pressure in the tank and
   a control unit which initiates an air supply and at least one of two aerosol pumps and an oil over-enriching pump to generate oil-air mixes, and
   wherein the control unit is responsive to the aerosol pressure and is configured to stop the oil over-enriching pump when a first predetermined supply pressure p2 has been exceeded, stops at least one aerosol pump when the sensed aerosol pressure exceeds a predetermined, maximum permissible second supply pressure p4, starts the at least one aerosol pump when the sensed aerosol pressure decreases below a predetermined third supply pressure p3, and starts the an oil over-enriching pump when the sensed aerosol pressure decreases below a predetermined fourth supply pressure p1, where p1<p2<p3<p4.

2. The apparatus as claimed in claim 1, wherein it is turned ON by a first standardized machine command transmitted through a control line and is turned OFF by a second standardized machine command.

3. The apparatus as claimed in claim 1, wherein the applied compressed air or aerosol feed is at about 6 bars in the tank, the supply pressures are approximately $p1=1.6$ bars, $p2=1.8$ bars, $p3=3.8$ bars and $p4=4.1$ bars.

4. The apparatus as claimed in claim 1, wherein two oil-air mix generators are driven in parallel to produce the oil-air mixes, each generator being fitted with its own oil conveying pump.

5. The apparatus as claimed in claim 1, wherein the oil over-enriching pump is connected by a conduit directly through the feed conduit to a tool and that an additional compressed air conduit to convey supplemental air is connected to at least one oil-air mix generator, the control unit shutting off the feed of supplemental air and the oil over-enriching pump when the first supply pressure value $p2$ has been reached.

6. The apparatus as claimed in claim 1, wherein the pumps and the oil over-enriching pump are pneumatic pumps which, are operated respectively by applied air respectively supplemental air.

7. The apparatus as claimed in claim 6, wherein the pumping output is regulated by frequency generators.

8. A method for preparing a fine oil mist and feeding it into tool lubricant ducts of CNC machine tools providing the apparatus of claim 1, where compressed air and oil are fed to oil-air mix generators to generate a fine aerosol, where pumps and the feed of compressed air are turned ON as a function of particular tools used, wherein an aerosol pressure is measured and the oil-air mix generators are driven solely as a function of preset aerosol supply pressure values.

9. The method as claimed in claim 8, wherein a first standardized machine command turns ON the apparatus and a second standardized machine command turns the apparatus OFF.

10. The method as claimed in claim 8, wherein the pumps used in aerosol generation, when regulated, operate continuously within a supply pressure range between $p0=0$ bar and $p4<6$ bars.

11. The method as claimed in claim 8, wherein the control unit turns ON an oil over-enriching pump when a supply pressure decreases below a predetermined supply pressure $p1$ is and wherein said control unit feeds supplemental air to at least one of the oil-air mix generators.

12. The method as claimed in claim 8, wherein the compressed air or aerosols are fed at about 6 bars into the tank, the supply pressures are approximately $p1=1.6$ bars, and $p4=4.1$ bars.

* * * * *